Apr. 17, 1923.   1,451,893
W. D'A. RYAN
HEADLIGHT
Original Filed Dec. 17, 1921

Inventor
Walter D'Arcy Ryan
By his Attorneys Dodson & Roe.

Patented Apr. 17, 1923.

1,451,893

UNITED STATES PATENT OFFICE.

WALTER D'ARCY RYAN, OF SCHENECTADY, NEW YORK.

HEADLIGHT.

Application filed December 17, 1921. Serial No. 523,034. Renewed February 28, 1923.

*To all whom it may concern:*

Be it known that I, WALTER D'ARCY RYAN, a citizen of the United States, residing at Schenectady, in the county of Schenectady and State of New York, have invented a new and useful Improvement in Headlights, of which the following is a specification.

My invention relates to the art of illumination as applied to, and adapted for, vehicles, automobiles, and the like, and has for its object to combine light sources connected therewith into conjoined functioning to produce a thoroughly efficient and glareless means to adequately illuminate the roadway and yet cause such illumination to be glareless so as not to interfere with approaching people.

Figure 1:
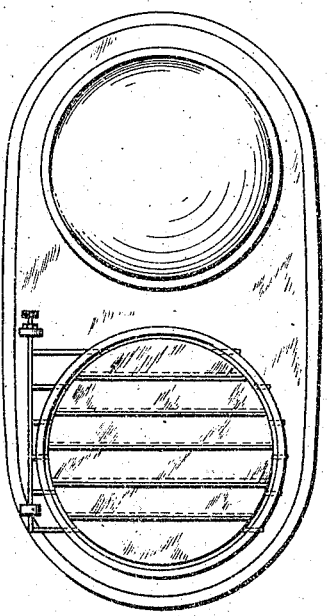
Figure 2:
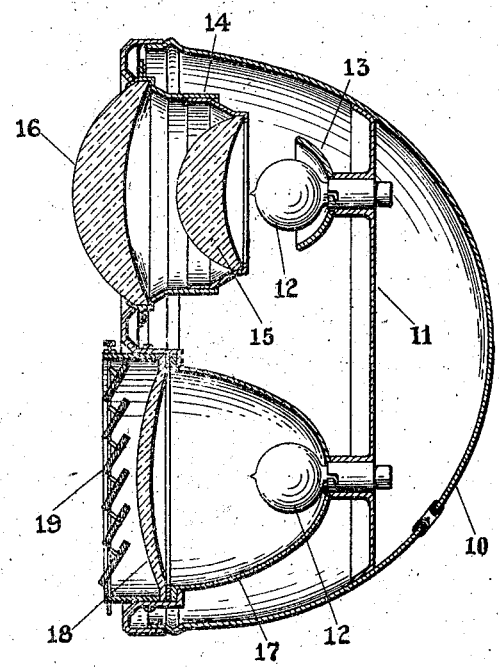

My invention consists of certain details of construction hereinafter set forth, pointed out in my claims and illustrated in the accompanying drawings, in which Figure 1 shows a front elevation view of one of a pair of lamps, for an automobile, fitted out with my improvement:

Figure 2 shows a longitudinal sectional view of the same, some of the parts being in elevation.

Referring to the accompanying drawings the reference numeral 10 is used to indicate the body, or casing, of one of a pair of headlights. Securing means 11 is provided for the mounting of the lamps 12, to be used, and these lamps are provided with electrical connections (not shown) for supplying light thereto. One of said lamps is mounted (preferably) near the upper part of the body of the headlight, and a small spherical reflector 13 is mounted immediately behind it. This reflector is constructed and mounted so as to re-direct the light rays which impinge thereon, back through the focal center of the light source, and does not function to re-direct any light rays outwardly toward the lenses. In advance of this lamp 12, I have mounted a frame 14, designed to receive and retain a pair of lenses, 15 and 16 respectively. The lenses 15 and 16 are each, preferably, concavo-convex, but the lens 15 (the one nearest the lamp) is much smaller than the lens 16, and also its convex surface is formed on a much smaller radius. This lens is for the purpose of gathering the maximum amount of light, and is formed and mounted in proper relationship to the lamp to accomplish that purpose. The lens 16 is for the purpose of concentrating the light received from the lens 15, and project it, at the desired angle of dispersion, to the roadway at a pre-determined distance, and the said lens is formed and mounted in the proper relationship to the lens 15, to accomplish this purpose.

This combination of lenses, lamp and reflector, will produce a glareless beam of light striking the roadway at the pre-determined distance from the automobile, but it does not function to illuminate the roadway in close proximity to the machine.

The lower lamp 12, is surrounded by a reflector 17, preferably parabolic in conformation, which projects forwardly from the lamp, as shown. Covering the forward open face of this reflector is a lens 18, which is designed to function in the ordinary and customary manner. It is obvious this arrangement will produce an intense glare, and I have, therefore, provided a plurality of light deflecting shutters 19, secured in parallel formation, their forward ends depending on an angle from the horizontal, the arrangement being such that no ray of light, redirected from the reflector and which would ordinarily be projected at an angle upwardly from the reflector, can escape impinging upon one of the shutters and be deflected downwardly thereby. This combination of lamp, reflector and shutters, must be in the proper relationship to accomplish this purpose.

In my combination of lamps, with their surrounding modifying means, the lower combination effectually and satisfactorily illuminates the roadway adjacent, and to the sides of, the automobile, and in addition blends into the illumination from the upper combination, which effectually and satisfactorily illuminates the roadway far in advance of the automobile.

In determining the relationship of the elements comprising my upper combination, it is my purpose to so arrange them that the two headlights, which are ordinarily used on an automobile, will project converging beams which will meet at a pre-determined distance from the machine, preferably about three hundred feet. By this arrangement the projected beams (one from each of the headlights on the different sides of the machine) will cross at the pre-determined distance, and thereafter will go off into the fields on the sides of the road, thus providing additional means for securing comfort and ease to an approaching person or driver. This may be accomplished by either of the ordinary means, the first being by inclining the lamps toward each other and the second means being by setting the lamp bulbs off center with relation to their reflectors.

In explaining my invention I have illustrated and described it as applied to an automobile, and for two headlights (each with its lamp combinations) functioning together, but I want it understood that my invention will function perfectly by the use of only one headlight, which may be placed at any desired position on a car or an automobile, or that my invention may be applied to any device other than an automobile, for which it may be adapted, and therefore, I do not want to be understood as limiting my invention, other than by the claims as appended hereto.

Having thus described my invention, what I claim and desire to secure by Letters Patent of the United States, is:

1. A headlight composed of a two unit combination, the first unit having a light source, a gathering lens mounted in spaced relationship to the light source, and a second lens for projecting the light, received from the first lens, into the roadway, at a predetermined distance from the vehicle, mounted in spaced relation to the first lens, the second unit having a light source, surrounded by a reflector, and shutters mounted in relation thereto, to receive the light rays from the source and the reflector, and deflect them downwardly in close proximity to the vehicle, to light the roadway directly in front, and to the sides of the vehicle, the light from the two units fusing to form, in combination, means which provides a continuously and smoothly lighted field in advance of the vehicle, substantially as shown and described.

2. A headlight composed of a two unit combination, the first unit comprising a light source and a spherical reflector mounted so as to return all rays of light which impinge thereon back through the focal center of the light source, and a gathering lens, formed and mounted with relation to the light source, to gather the light rays and project them forwardly, the angle of entrance and exit of the light rays being substantially equal, and a second lens formed and mounted with relation to the first lens, to receive the light rays projected therefrom and project them forwardly in a long narrow beam in advance of the vehicle, the angle of entrance and exit of the light rays being substantially equal; the second unit comprising a light source surrounded by a reflector, and shutters mounted in front of the light source to receive the rays of light and deflect them downwardly in close proximity to the vehicle, to light the roadway directly in front of, and to the sides of the vehicle, the light from the two units fusing to form, in combination, a continuously and smoothly lighted field in advance of the vehicle, substantially as shown and described.

WALTER D'ARCY RYAN.